United States Patent [19]

Cronch et al.

[11] Patent Number: 4,706,008
[45] Date of Patent: Nov. 10, 1987

[54] SELF-ADJUSTING HOMING FOR A STEPPING MOTOR

[75] Inventors: Darell D. Cronch; Richard T. Fisher, both of Georgetown; Patricia A. Graham; John E. Passafiume, both of Lexington, all of Ky.

[73] Assignee: IBM Corporation, Armonk, N.Y.

[21] Appl. No.: 940,329

[22] Filed: Dec. 11, 1986

[51] Int. Cl.⁴ .............................................. H02P 8/00
[52] U.S. Cl. .................................... 318/696; 318/685; 400/902; 400/903
[58] Field of Search ................... 318/696, 685; 360/78; 400/902, 903

[56] References Cited

U.S. PATENT DOCUMENTS

| | | | |
|---|---|---|---|
| 3,842,331 | 10/1974 | Hendrickson et al. | 318/685 |
| 3,845,378 | 10/1974 | Hendrickson et al. | 318/685 |
| 3,944,902 | 3/1976 | Lacorre et al. | 318/593 |
| 3,946,298 | 3/1976 | van de Loo | 318/685 |
| 3,986,094 | 10/1976 | Quioque et al. | 318/696 |
| 3,992,614 | 11/1976 | Buss | 235/151.1 |
| 4,042,869 | 8/1977 | Eickelberg et al. | 318/630 |
| 4,066,943 | 1/1978 | Roch | 318/468 |
| 4,129,813 | 12/1978 | Hunts et al. | 318/561 |
| 4,297,626 | 10/1981 | Chiang | 318/696 |
| 4,330,739 | 5/1982 | Chiang | 318/696 |
| 4,356,439 | 10/1982 | Mott et al. | 318/685 |
| 4,409,530 | 10/1983 | Neeper et al. | 318/685 |
| 4,414,496 | 11/1983 | Watanabe et al. | 318/696 |
| 4,458,185 | 7/1984 | Matty et al. | 318/270 |
| 4,475,082 | 10/1984 | Lindig | 324/160 |
| 4,602,882 | 7/1986 | Akazawa | 400/322 |
| 4,622,505 | 11/1986 | Okabayashi et al. | 318/696 |
| 4,633,346 | 12/1986 | Sasaki et al. | 360/78 |

Primary Examiner—William M. Shoop, Jr.
Assistant Examiner—Saul M. Bergmann
Attorney, Agent, or Firm—Pollock, Vande Sande & Priddy

[57] ABSTRACT

For step motors positioned in response to an external reference location, correction for potential one step misalignment is provided. The method and the apparatus of the invention provide a read/write memory, for storing therein a phase state of the step motor at a particular location, e.g. a home position. The home position may coincide with the external reference location or may be offset therefrom by some predetermined move of the step motor. During cold starts, where memory is not retained, the step motor is moved to its home position and then the phase state of the machine is saved. On subsequent warm starts, after the step motor is moved to the assumed home position, the step motor is controlled to assume the phase state that has been previously stored.

9 Claims, 9 Drawing Figures

SELF-ADJUSTING HOMING FOR A STEPPING MOTOR

DESCRIPTION

1. Technical Field

The present invention relates to stepping motors and more particularly to a method and apparatus for eliminating single step errors in open loop stepping motor systems.

2. Background Art

Known stepping motors are extremely accurate in providing relative translation or rotation; this extreme accuracy has led to popular use of open loop stepping motor systems in which reliance for accuracy is wholly placed on the stepping motor. Since the stepping motor is only capable of providing relative location, some external reference information must be provided in order to assure accurate absolute positioning. Such an external reference is usually provided in the form of some position sensor which provides a signal (such as a transition in voltage or current) at a particular absolute position, which will be sometimes referred to as the reference location or position. Typically, moves of the motor are defined with respect to a home position which may, but need not be, coincident with the reference location, so long as the home position can be identified relative to the reference location. Once the motor is at the home position, subsequent relative moves can be correlated to an absolute location by tracking the number of steps from the home position. Examples of such open loop positioning techniques are found in U.S. Pat. Nos. 3,944,902; 3,992,614; 4,066,943; 4,409,530 and 3,986,094.

SUMMARY OF THE INVENTION

In these, and in any other system in which absolute positioning depends on an external reference, the external reference or some position referenced to the external reference is considered to correspond to a predetermined phase state. See for example U.S. Pat. No. 3,986,094 (col. 10 at line 52) and U.S. Pat. No. 4,066,943 (col. 7, line 29 et seq). This arrangement works quite well so long as the external reference can be unambiguously defined and correlated with the predetermined phase state. Unfortunately, in many mass produced stepping motor systems, the external reference may be located at or near a phase state transition. Under these conditions the home position may vary by a single step depending on whether or not the external reference is physically correlated with one phase state or its adjacent phase state. This can result in a one step misalignment error between sequential motor initializations. Of course, this problem can be overcome by tightening manufacturing tolerances (with the associated increase in cost), or may require an undesirable manual adjustment step in the course of manufacture (with an associated cost). It is thus an object of the present invention to provide a method and apparatus for overcoming such one step misalignment errors in enhancing the stepping motor's position repeatability.

It should be clearly understood that while we have referred to an external reference and a home position, in some instances these may be identical, but need not be so. Thus, the home position is necessarily defined with respect to the external reference, but it need not be identical thereto. For example the home position can be defined as a particular number of steps from the external reference. The motor may be positioned the given number of steps under single step operation, a constant velocity or even a slewing type move.

Position repeatability in accordance with the invention is enhanced by performing an initialization procedure. The initialization procedure that is performed is either a first type of initialization procedure for a "cold" start or a second type of initialization procedure which is performed for a "warm" start. In order to perform the initialization procedure in accordance with the invention, the stepping motor system is provided with a read/write memory as well as the ability to distinguish whether a "warm" or "cold" start is being executed. The difference between a "warm" and a "cold" start is that in a "cold" start memory is not retained from prior operation whereas memory has been retained at the "warm" start.

The initialization procedure includes:

(1) energizing the motor and allowing it to stabilize; and (2) stepping the motor until the external reference location is observed.

For "cold" starts, the last step of the procedure requires a phase state to be saved. The saved phase state may correspond to the reference position or to a related home position.

For "warm" starts, after the external reference is recognized, the motor is controlled first to move in accordance with the predetermined offset between the reference location and assumed home position, if any, and then to bring it into coincidence with the previously saved phase state and a sufficient delay is executed to allow the motor to settle into that state. In accordance with the "warm" start initialization procedure, a motor phase adjustment of $+1$, 0 or $-1$ steps is possible for reasons which should be apparent.

It is quite common for a stepping motor system to operate discontinuously, that is, the system may operate during a first period of time, be turned off and then turned back on to operate during a second period of time. In many cases there is a desire (or necessity) for the motor to reposition itself during the second period of operation to an identical position attained in the first period of operation.

The prior art approaches will, given the loose manufacturing tolerances, approach but not necessarily attain the desired goal. The prior art potential for misalignment is eliminated by employing the invention, as follows. Once a cold start has been effected, the stepping motor system may thereafter operate quite discontinuously and so long as provision is made for effecting only warm starts, no misalignment will occur due to initialization procedures. This of course requires memory retention, but this is possible using a conventionally available non-volatile memory for retaining phase state information. A non-volatile memory may be eliminated so long as power to a volatile phase state memory is continuous.

In accordance with the preferred embodiment of the invention the read/write phase state memory can be a conventional random access memory with a battery backup.

The phase state saved can be that corresponding to the external reference or a related phase state. For example there may be a fixed number of steps between the external reference and home position. In this case, the phase adjustment can be made at the home position and not when the external reference is sensed.

By employing the invention the one step misalignment error which may exist between "warm" starts is eliminated.

Accordingly, the invention provides a positioning device including:

a stepping motor;

position sensor means coupled to the step motor to generate a position signal when the step motor is at a predetermined location;

read/write memory means for storing data defining a phase state of the step motor;

means for determining availability of previously written phase state data in said read/write memory means; and correction means for driving said stepping motor to bring an actual phase state of the stepping motor into correspondence with the stored data in response to operation of said position sensor means.

In accordance with this aspect, the invention also includes means enabled in response to a determination of the lack of previously written phase state data by said means for determining, to detect a phase state of the step motor; and write means for writing said detected phase state of the step motor into said read/write memory means.

BRIEF DESCRIPTION OF THE DRAWINGS

The present invention will now be described in the following portions of the specification when taken in conjunction with the attached drawings in which like reference characters identify corresponding apparatus and in which.

DETAILED DESCRIPTION OF A PREFERRED EMBODIMENT

Figure 1:
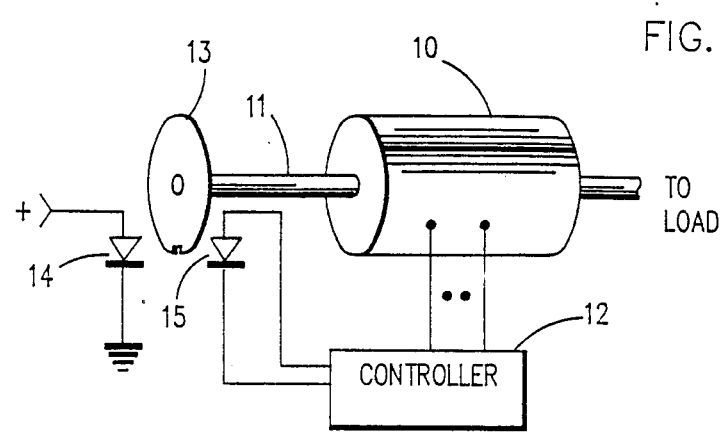
FIG. 1 is a block diagram of a conventional step motor with an external reference location.

FIG. 1 shows a block diagram of a step motor whose position repeatability can be improved in accordance with the present invention. More particularly, as shown in FIG. 1 a step motor 10 is arranged to drive (rotate) a load shaft 11; the step motor 10 is controlled by a controller 12, one input of which is provided by an external position reference. The external position reference shown in FIG. 1 is developed by a notched disk 13 attached to the shaft 11 which develops an optical signal when the shaft 11 is at one particular orientation by passing light from an LED 14 to a photodetector 15. Those skilled in the art will understand that this particular external reference will develop an electrical signal corresponding to one position in the shaft for every 360° of rotation; there are other conventional external references which do not have this 360° ambiguity, and a reading of the application will reveal that any external reference can be employed in accordance with the invention.

Figure 3:
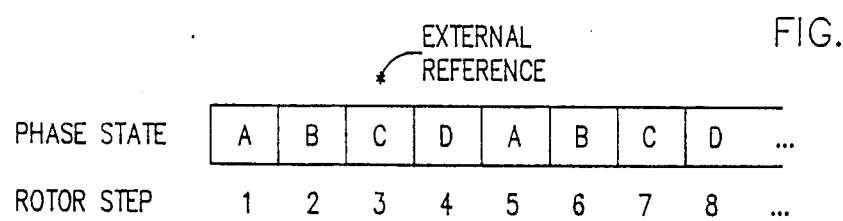
FIG. 3 relates step motor phase state and rotor displacement with an external reference location.
Figure 4:
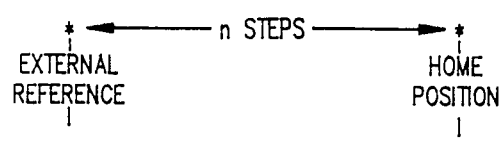
FIGS. 4-6 show different relationships between an external reference location and a home location.
Figure 5:
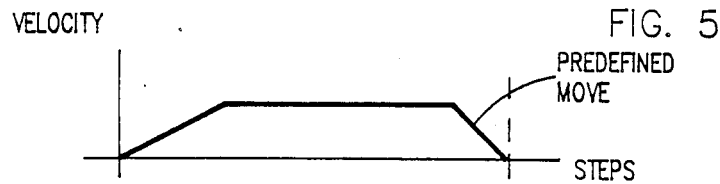
Figure 6:
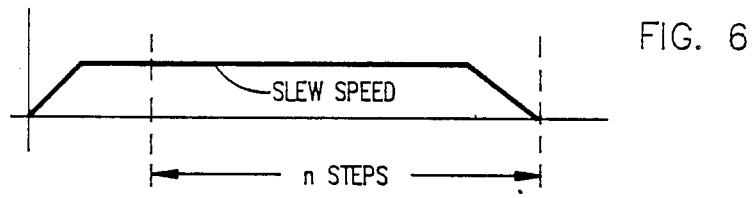

FIG. 3 shows a bar chart correlating, for the step motor 10, step motor phase state, rotor displacement and the external reference location. As shown in FIG. 3 the phase states occur in a sequence which repeats. Thus for example rotor step positions 2 and 6 have an identical phase state. FIG. 3 assumes that the external reference location corresponds to phase state C at rotor step 3. If we could be assured that the external reference would always be located within the boundaries of the phase state C, there would be no need for the invention. The problem solved by the invention arises because loose manufacturing tolerances result in the external reference location sometimes lying near a phase state boundary and in that case the external reference may eventually correspond to either phase state B or C leading to the one step misalignment. As has already been described, the home location may correspond to the external reference. FIG. 4 shows a different arrangement wherein the external reference is offset by n steps from the home position. FIG. 5 shows an arrangement similar to FIG. 4 in that there are n steps between external reference and home location but which differs from FIG. 4 in the manner in which that offset is implemented; FIG. 5 specifically suggests a move including a constant velocity segment. FIG. 6 shows still a different arrangement relating the external reference and the home position. More particularly, with the stepping motor moving at slew speed the external reference is sensed, thereafter the stepping motor is brought to a stop in n steps wherein some or all of the motion may be decelerating motion and some of the motion may be at slew speed.

Regardless of how the relationship between the external reference location and the home position is defined, if they are different then the motor must be allowed to move, from the position at which the external reference is sensed, to the expected or predicted home position before a step of the invention is applied to correct for any misalignment. In the case of FIGS. 4 and 5, if the stored phase state corresponds to the reference location (rather than the home position) the inventive correction can be applied at the reference location. The essential point is that the correction determined by the invention is applied at that location at which the stored phase state was determined.

Figure 7:
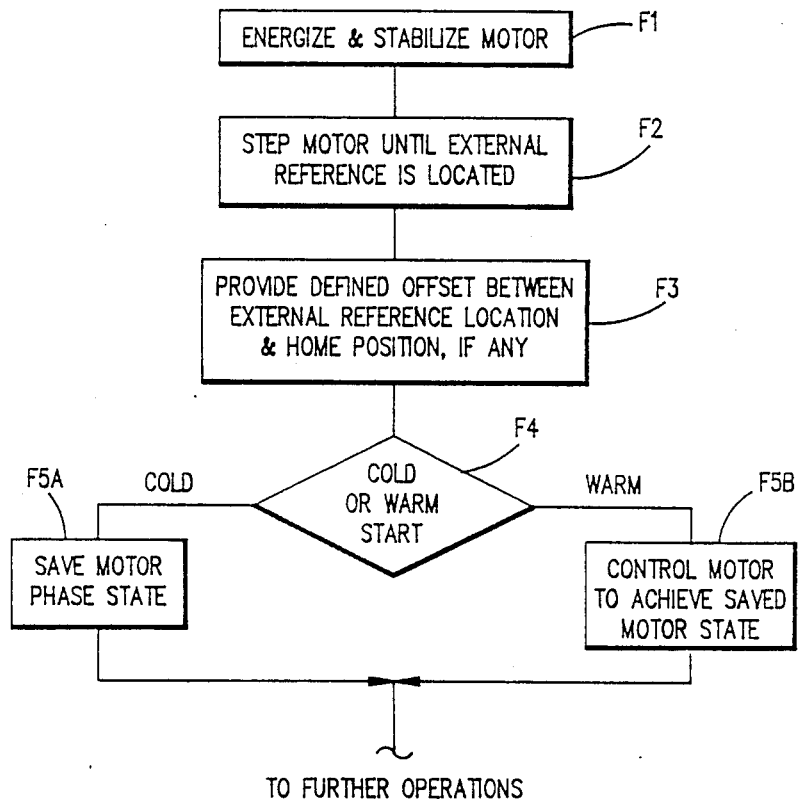
FIG. 7 is a functional block diagram illustrating the steps carried out in accordance with an embodiment of the invention.

FIG. 7 is a functional description of the various steps effected by operation of the invention. The motor is started, i.e. energized, and stabilized by function F1. Function F2 steps the motor until the external reference is located. Typically other procedures would be used to assure the just initialized motor controller is "aware" of the direction the motor need be stepped in to locate the external reference. This can be accomplished for example by always moving the motor to a predetermined location when it is stopped and thereafter always controlling the motor to step, from that assumed position toward the external reference location. Those skilled in the art are aware of other procedures which can be employed to ensure that function F2 can be successfully performed. Function F3 is then performed to provide the defined offset between the external reference location and the home position, if any. That defined offset can be for example the definition shown in any of FIGS. 4-6. At the conclusion of step F3 the motor is either at the desired home position or misaligned with that home position by plus or minus one step. Function F4 determines whether this is a cold or a warm start, e.g. has memory been retained over the last on/off and off/on transitions? If memory is not retained then this is a cold start and function F5A is performed to save the present phase state of the motor. On the other hand if this is a warm start then function F5B is performed to control the motor to achieve the saved motor phase state. As has already been described in the course of executing step F5B the motor may be moved plus or minus one step, or remain unmoved if there was no misalignment error.

In the event controller 12 is or includes a computer, then the invention can be implemented by software performing the function of FIG. 7.

Figure 2:
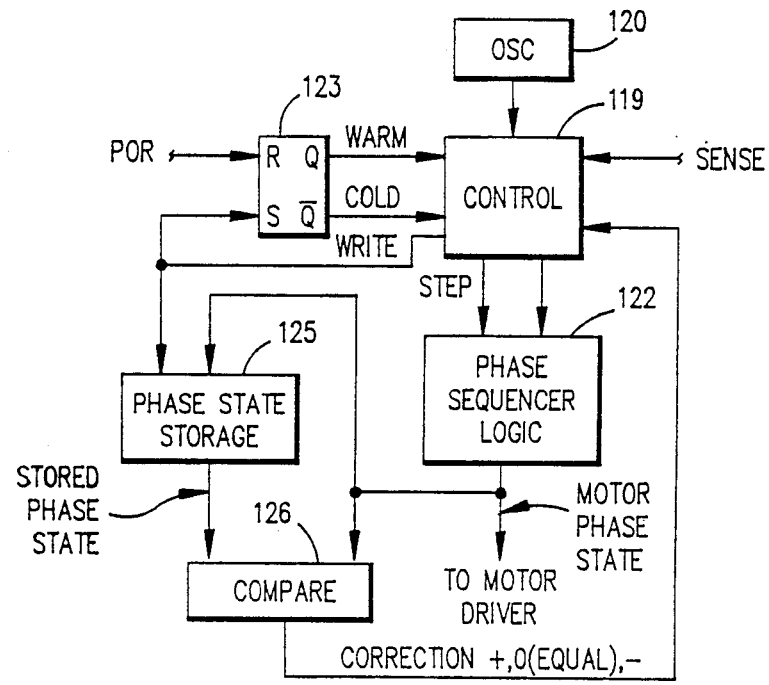
FIG. 2 is a block diagram of apparatus to implement one embodiment of the invention.

FIG. 2 is a block diagram of apparatus (as an alternative to that just described) that can be employed in accordance with the invention. More particularly, FIG. 2 shows that an oscillator 120 drives a control element 119. The control element 119 provides step, rate and direction information to a phase sequencer logic 122. The phase sequencer logic 122 outputs an identification of the next motor phase state, which is coupled to the motor driver (not illustrated). The control element 119 is also subjected to a sense input from the device sensing the external reference location (for example the photo responsive diode 15, FIG. 1). The control element 119 also receives an input from a flip-flop 123 identifying whether or not a warm or a cold start (as previously defined) is being performed. And finally the control element 119 receives the output of a compare element 126 to identify whether or not a correction is necessary, and if it is, the sense of that correction. In addition to driving the phase sequencer logic 122, the control element 119 also provides a WRITE signal to a phase state storage 125. The phase state storage 125 also receives motor phase state information from the phase sequencer logic 122, and in the presence of the WRITE signal, writes that information for future reference. The stored phase state information, stored in the storage 125 is provided as an input to the compare element 126, the other input of which is provided by the output of the phase sequencer logic 122, e.g. the motor phase state. Thus the comparator 126 can determine whether or not its two inputs are equal, and in the event of an inequality, determine the sense of that inequality to provide the input for the control element 119 already described.

The flip-flop 123 is the apparatus employed to determine whether or not a warm or a cold start is being effected. The flip-flop 123 receives a resetting signal in the form of a POR (power on reset). Accordingly, the flip-flop 123 is, absent other input signals and subsequent to receipt of a POR, in a reset state. In the event that subsequent to the last POR, the control element 119 outputs the WRITE signal, the flip-flop 123 will be in a set state since the WRITE signal is coupled to the set input of the flip-flop 123. If the phase state storage 125 had been rewritten subsequent to the last POR, then the flip-flop 123 indicates any start operations are warm starts. On the other hand, if a POR is received subsequent to any WRITE signals, then the flip-flop 123 indicates any starting operation as a cold start.

Figure 8:
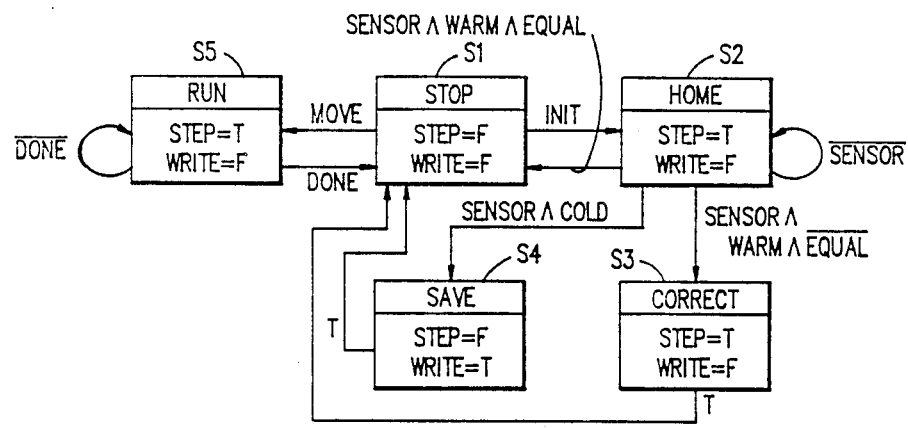
FIGS. 8 and 9 are state diagrams useful in describing the operation of control 119.

The functions performed by the control element 119 insofar as they are relevant to the invention are described in connection with FIG. 8. FIG. 8 shows five different states for the control 119 and these are identified as S1-stop, S2-home, S3-correct, S4-save and S5-run. With respect to each state, the conditions of the step output and the write signal are identified. In addition, the conditions under which a transition is effected are also defined as well as the state to which the transition brings the machine. Step=True(T) indicates that the controller 119 provides step pulse and direction commands to the phase sequencer 122.

For example, the machine undergoes a transition from S1 to S2 in the presence of an initialization (INIT) which may or may not include a POR (power on reset). Under these circumstances, the step output changes to true, to move the motor; we remain in this state until the sensor input is active, identifying that we have reached the predetermined reference location.

The transition from state S2 is then either to states S1, S3 or S4, depending on the outputs of the flip-flop 123 (warm or cold) and the output of the comparator 126 (equal or unequal). There is a transition from state S2 to state S3 when the comparator indicates an inequality, e.g. there is a correction to be made during the course of a warm start, e.g. phase state information has been retained. In state S3, the control element provides a step command to the phase sequencer logic 122 along with a direction command determined by the sense of the error detected at the comparator 126. The transition, thereafter is to state S1. At this point the stepping motor system has been initialized to the predetermined phase state corresponding to the phase state saved in the phase state storage 125.

On the other hand, for a cold start, the transition is from state S2 to state S4. In state S4 the control element 119 does not provide a correction to the phase sequencer logic 122 (the step command is false) but rather the WRITE signal becomes true. This provides for rewriting the phase state storage 125, as well as setting the flip-flop 123. The transition from state S4 is to state S1.

If the conditions input to the control element 119 indicate that a warm start is being performed and there is no need for correction (the compare element 126 indicates an equality) then the transition is from state S2 to state S1.

State S5 is shown to indicate control of the step motor subsequent to initialization, e.g. this is the run state. This transition is effected in response to a move command (which, as with the INIT command, is input to the control element 119 from apparatus not illustrated). During the run state the step output is true and the write output is false. This state is maintained until the move has been completed and thereafter the transition is back to state S1.

The foregoing description of the various states of the control element 119 has been provided in connection with an embodiment of the invention in which the reference location and the home position are identical.

Figure 9:
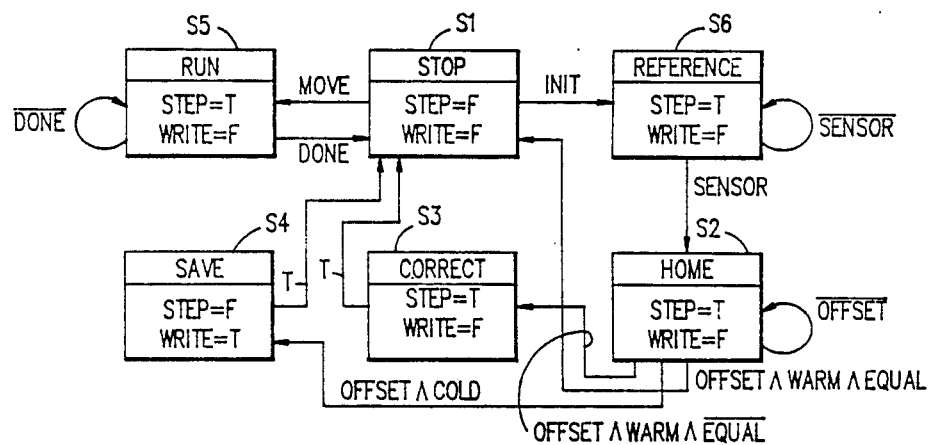

For the general case in which the reference location and home position are different, the state diagram of FIG. 9 is employed. FIG. 9 is generally similar to FIG. 8 except that during the initialization process the transition from step S1 is to a new step S6, the reference state. The reference state has the step output true, and the write output false, and is maintained until the sensor output is detected. When the sensor output is detected, a transition is made to the home state S2. The home state S2 is similar to the state S2 of FIG. 8 except that it is maintained while OFFSET is false, e.g. until the stepping motor has made the n step move between the reference location and the home position. When OFFSET is true, then the transition is to one of three states, to the stop state S1, the correct state S3 or the save state S4, based on essentially the same conditions referenced in FIG. 8 for the transition from state S2 to states S1, S3 or S4.

Operation of the apparatus shown in FIG. 2 should by now be apparent, especially in connection with the definition of the control element 119 provided by FIGS. 8 and 9. More particularly, whenever a cold start is effected, the stepping motor is driven until the reference location is sensed. At that point any offset between the reference location and the home position is used to provide further motion for the stepping motor. When the home position is reached, the phase state of the machine is saved. Thereafter the machine can be operated in accordance with conventional techniques. If at any time subsequent thereto the machine must be reinitialized, e.g. it has broken phase or the output shaft has been manually moved, or for any other reason, the initializing input is arranged to drive the stepping motor to search for the reference location. When the reference location is found, the stepping motor is further moved in accordance with the offset between the reference location and the home position (if any). At that point, the motor phase state is compared to the save state, and if a correction is necessary it is effected. Thereafter, the machine can be operated in accordance with conventional techniques.

In the foregoing description, the POR input has been used to represent an event occurring subsequent to loss of memory in the phase state storage 125. If the phase state storage 125 is non-volatile (does not require power to maintain memory), then the signal POR is produced only as a result of a mechanism change, regardless of whether or not other components in the stepping motor system are ever deenergized. Accordingly, as employed in the application, POR is present only when the stepping motor system is to be initialized and the phase state storage 125 does not contain meaningful phase state data for initialization purposes.

Those skilled in the art will be aware that other and different variations can be employed without departing from the spirit and scope of the invention which is to be construed in accordance with the attached claims.

Having thus described our invention, what we claim as new, and desire to secure by Letters Patent is:

1. A positioning device comprising:
   a step motor;
   position sensor means coupled to said step motor to generate a position signal when said step motor is at a predetermined location;
   read/write memory means for storing data defining a phase state of said step motor;
   means for determining availability of previously written phase state data in said read/write memory means; and
   correction means for driving said step motor to bring an actual phase state of said step motor into correspondence with said stored data.

2. The device of claim 1 further including:
   control means enabled in response to a determination of unavailability of previously written phase state data by said means for determining to detect a phase state of said step motor; and
   write means for writing said detected phase state of said step motor into said read/write memory means.

3. The apparatus of claim 1 including:
   means responsive to said position signal to execute a predetermined move of said step motor and subsequently to enable operation of said correction means.

4. The apparatus of claim 2 including means responsive to said position signal to execute a predetermined move of said step motor, and subsequently to enable said control means.

5. A method of positioning a step motor to overcome misalignment errors as a result of loose manufacturing tolerances including:
   (a) providing a phase state storage for storing data definitive of a specified phase state of said step motor;
   (b) energizing said step motor and searching for a position signal defining an external reference location;
   (c) determining whether said phase state storage retains data definitive of a specified phase state of said step motor; and
   (d) if such specified phase state data is retained, thereafter controlling the phase state of said step motor to achieve said stored phase state.

6. The method of claim 5 which includes, if such specified phase state data is not retained, the further step of:
   (e) and in lieu of said step (d), storing specified phase state data in said phase state storage.

7. The method of claim 5 including the further step, subsequent to step (b) and prior to step (d) of:
   (e) executing a predetermined move of said step motor.

8. The method of claim 6 including the further step, subsequent to step (b) and prior to step (e) of: (f) executing a predetermined move of said step motor.

9. The method of claim 8 in which the specified phase state data stored in step (e) defines a phase state of the step motor subsequent to the move of step (f).

* * * * *